US012753594B2

(12) United States Patent
Farley

(10) Patent No.: US 12,753,594 B2
(45) Date of Patent: Oct. 6, 2026

(54) SHOWERHEAD HAVING MULTIPLE INTEGRATED MOUNTING LOCATIONS

(71) Applicant: David Farley, Corona, CA (US)

(72) Inventor: David Farley, Corona, CA (US)

( * ) Notice: Subject to any disclaimer, the term of this patent is extended or adjusted under 35 U.S.C. 154(b) by 495 days.

(21) Appl. No.: 18/218,295

(22) Filed: Jul. 5, 2023

(65) Prior Publication Data

US 2025/0012062 A1 Jan. 9, 2025

(51) Int. Cl.
*E03C 1/06* (2006.01)
*B05B 15/62* (2018.01)
*E03C 1/04* (2006.01)

(52) U.S. Cl.
CPC ................ *E03C 1/06* (2013.01); *B05B 15/62* (2018.02); *E03C 1/0409* (2013.01)

(58) Field of Classification Search
CPC .......... E03C 1/06; E03C 1/0409; B05B 15/62
See application file for complete search history.

(56) References Cited

U.S. PATENT DOCUMENTS

2023/0085999 A1* 3/2023 Quinn ................... E03C 1/0409 4/570

FOREIGN PATENT DOCUMENTS

CN 206308751 U 7/2017

* cited by examiner

*Primary Examiner* — Steven M Cernoch
(74) *Attorney, Agent, or Firm* — Stetina Garred Brucker & Newboles

(57) ABSTRACT

A showerhead includes an elongate handle and a spray head coupled to the elongate handle. The spray head includes a plurality of openings configured to facilitate spraying of water when the showerhead is connected to a water source. A first attachment body extends from the elongate handle and is configured to be selectively engageable with a docking bracket. A second attachment body extends from the spray head and is configured to be selectively engageable with the docking bracket. The showerhead is configured to be selectively engageable with the docking bracket in a raised configuration and a lowered configuration. In the raised configuration, the first attachment body is coupled to the docking bracket and the second attachment body is disconnected from the docking bracket. In the lowered configuration, the second attachment body is coupled to the docking bracket and the first attachment body is disconnected from the docking bracket.

19 Claims, 4 Drawing Sheets

SHOWERHEAD HAVING MULTIPLE INTEGRATED MOUNTING LOCATIONS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a showerhead, and more particularly, to a hand holdable showerhead configured to be selectively attachable to a docking bracket in a lowered showerhead configuration and a raised showered configuration, as may be desired by a user.

2. Description of the Related Art

Conventional showerheads typically include a sprayer mounted in a generally fixed position on the end of a water line elevated above a shower or tub. This arrangement may allow pressurized water to be directed in a downward direction toward a user to facilitate washing and rinsing of dirt and soap from the user's body. The elevated, generally fixed, position of the sprayer has proven to be useful for many individuals. However, there are some limitations to a fixed sprayer.

One limitation commonly associated with a fixed sprayer is that targeted spraying to certain areas of the user's body may be difficult, particularly lower areas of the user's body. Furthermore, tall individuals may be challenged by the fixed location of the sprayer, as their head may extend above the sprayer, which may require bending of their head to place it within the stream of water. Another drawback is that a fixed sprayer may be challenging for children, as they may be too short to be effectively rinsed by the water pattern created by the fixed sprayer. The water pattern may be too wide by the time it reaches the height of the child, and thus, a large portion of the water may not fall on the child. Fixed sprayers may also be challenging for the elderly or the disabled, who may need to shower in a wheelchair.

In view of these drawbacks, handheld sprayers have been developed, which include a sprayer head attached to a hose extending from a base or hub. The length of the hose provides a range of motion of the sprayer head to address some of the aforementioned deficiencies of fixed sprayers. For instance, the handheld sprayer may be grabbed by a user and moved into close proximity to the area on the user's body in need of rinsing.

Although handheld sprayers provide more range of motion than fixed sprayers, a common deficiency with handheld sprayers is that they are typically limited to being fixed at a particular height when attached to the base. Thus, while the ability to remove the sprayer from the base remains available in the case of a handheld sprayer, there are times when a user may need both hands for other purposes, such as applying soap or shampoo to one's body, or rinsing shampoo from one's hair or soap from one's face. Therefore, in such instances, it is desirable to dock the sprayer to the base to free up both of the user's hands. When docked, the sprayer be at a fixed height, and thus, may suffer from the same drawbacks associated with a fixed sprayer. In particular, the fixed height may be ideal for some users, while not being ideal for other users.

In view of foregoing, it is desirable to have a showerhead that addresses all of the deficiencies noted above. In particular, there is a desire for a showerhead that incorporates the functionality of a fixed sprayer as well as a handheld sprayer. Various aspects of the present disclosure address this particular need, as will be discussed in more detail below.

BRIEF SUMMARY

There is provided a hand holdable showerhead capable of being selectively attachable to a docking bracket in a first configuration, wherein a spray head is at an elevated position, and a second configuration, wherein the spray head is at a lowered position. The showerhead may also be removed from the docking bracket and used in a handheld mode to allow for more targeted spraying. The ability to selectively position the spray head relative to the docking bracket between raised and lowered positions when the showerhead is coupled to the docking bracket may allow individuals of different height to comfortably use the showerhead. In this regard, the showerhead may be associated with several fixed heights when docked, rather than merely a single fixed height.

In accordance with one embodiment of the present disclosure, there is provided a showerhead configured for use with a docking bracket. The showerhead includes an elongate handle and a spray head coupled to the elongate handle. The spray head includes a plurality of openings configured to facilitate spraying of water when the showerhead is connected to a water source. A first attachment body extends from the elongate handle and is configured to be selectively engageable with the docking bracket. A second attachment body extends from the spray head and is configured to be selectively engageable with the docking bracket. The showerhead is configured to be selectively engageable with the docking bracket in a first configuration and a second configuration. In the first configuration, the first attachment body is coupled to the docking bracket and the second attachment body is disconnected from the docking bracket. In the second configuration, the second attachment body is coupled to the docking bracket and the first attachment body is disconnected from the docking bracket.

The elongate handle may include a proximal end portion and a distal end portion, the proximal end portion being connectable to a hose and the distal end portion being connected to the spray head. The first attachment body may extend from the proximal end portion of elongate handle. The spray head may include a spraying face having a plurality of openings formed therein, and a rear surface opposite the spraying face. The second attachment body may extend from rear surface of the spray head. The first attachment body may extend along a first axis and the second attachment body may extend along a second axis offset from the first axis. The first axis may be offset from the second axis by 15-40 degrees.

The first attachment body may include a first tapered cylinder and the second attachment body may include a second tapered cylinder.

The showerhead may also include a first gripping ring coupled to the first attachment body and a second gripping ring attached to the second attachment body.

According to another embodiment, there is provided a showerhead assembly comprising a docking bracket having a docking sleeve. The showerhead assembly additionally includes a showerhead engageable with the docking bracket, with the showerhead comprising an elongate handle and a spray head coupled to the elongate handle. The spray head includes a plurality of openings configured to facilitate spraying of water when the showerhead is connected to a water source. A first attachment body extends from the elongate handle and is configured to be selectively engageable with the docking sleeve, and a second attachment body extends from the spray head and is configured to be selectively engageable with the docking sleeve. The showerhead is configured to be selectively engageable with the docking sleeve in a first configuration and a second configuration. In the first configuration, the first attachment body is coupled to the docking sleeve and the second attachment body is disconnected from the docking sleeve. In the second configuration, the second attachment body is coupled to the docking sleeve and the first attachment body is disconnected from the docking sleeve.

The docking sleeve may be configured to circumferentially engage the first attachment body when the showerhead is in the first configuration, and circumferentially engage the second attachment body when the showerhead is in the second configuration.

The docking bracket may include a connector configured to be attachable to a water line. The connector may be moveable relative to the docking sleeve.

The showerhead assembly may additionally include a hose connectable to the docking bracket and the showerhead to place the showerhead in fluid communication with the docking bracket.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a showerhead and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 2:
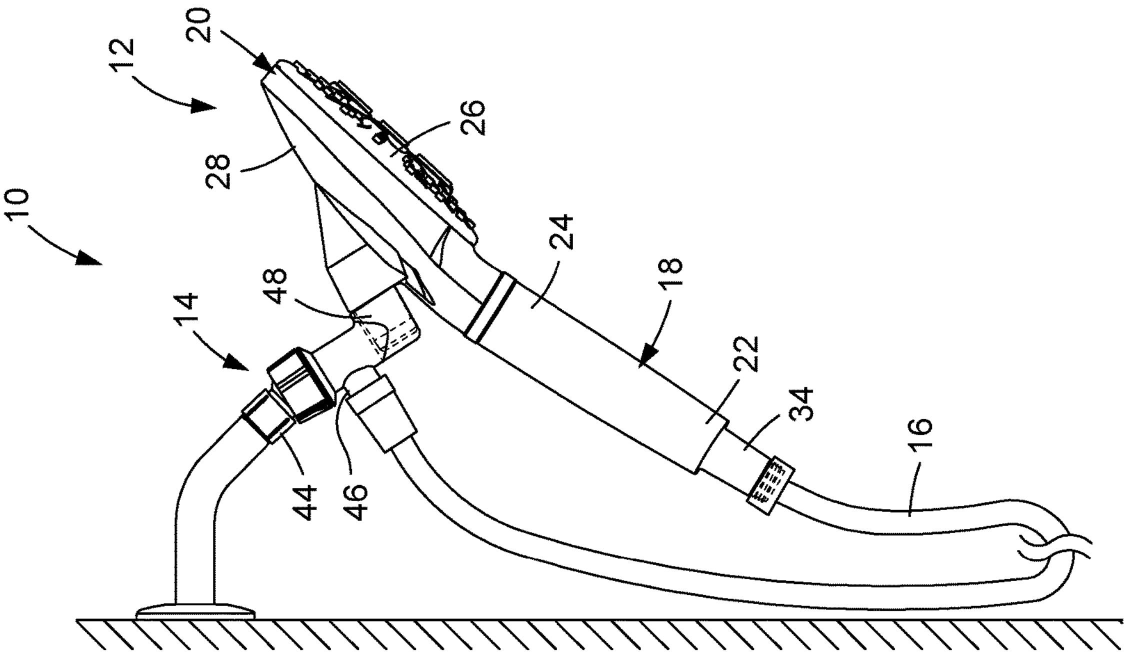
FIG. 2 is a side view of the handheld-type showerhead assembly with the showerhead attached to the retaining bracket in a lowered showerhead configuration.
Figure 1:
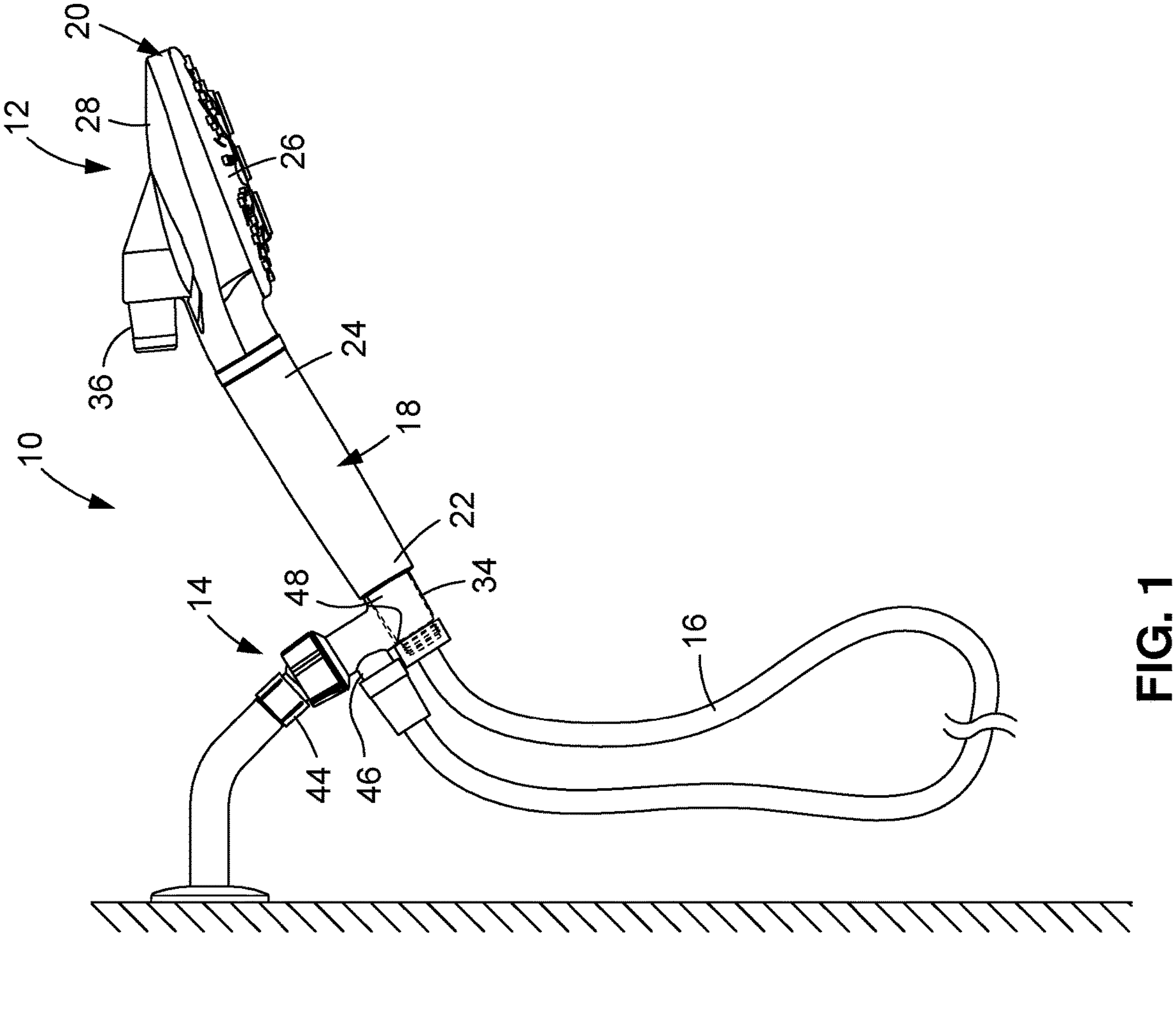
FIG. 1 is a side view of a handheld-type showerhead assembly including a showerhead attached to a retaining bracket in a raised showerhead configuration.
Figure 3:
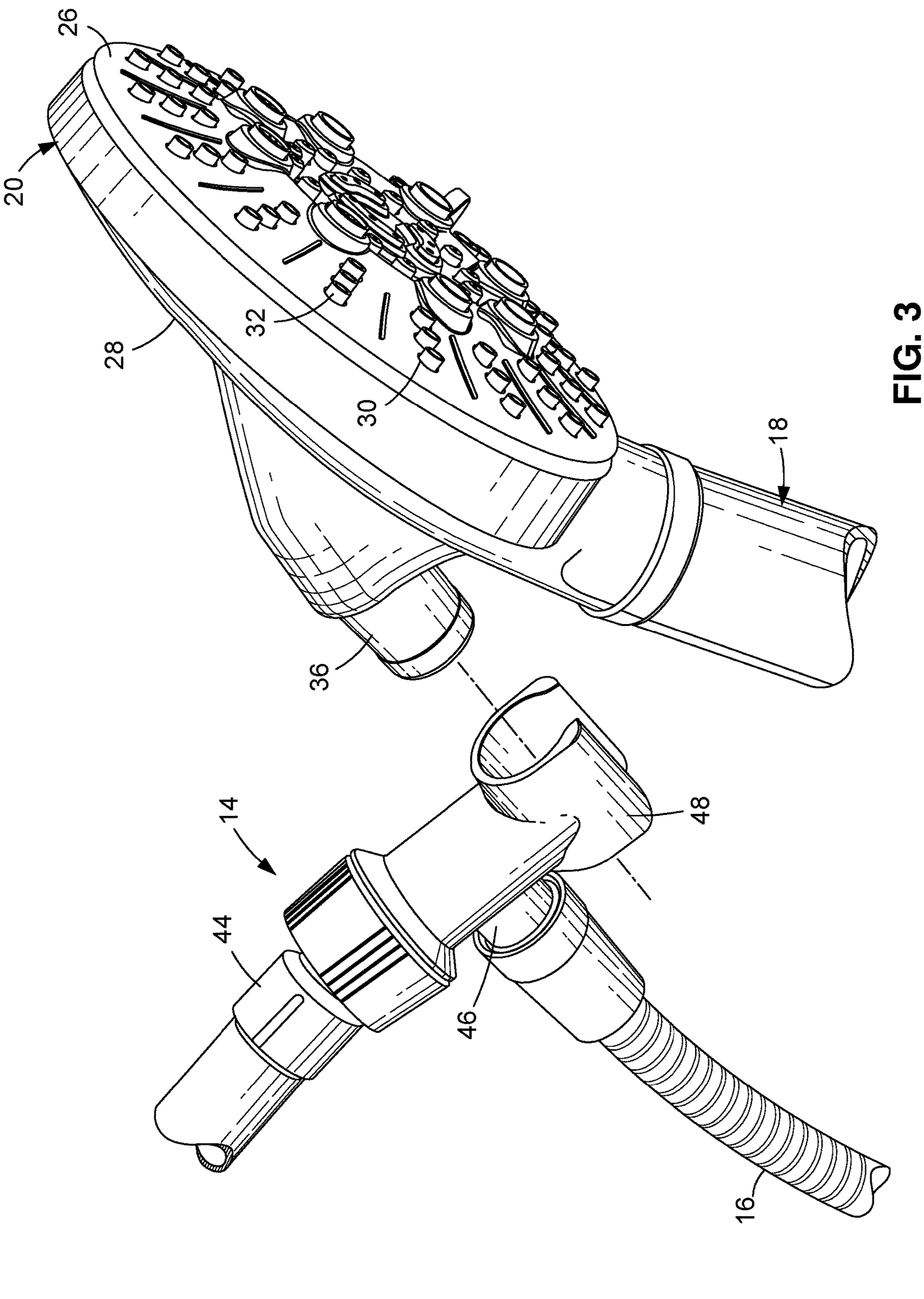
FIG. 3 is an enlarged, partial upper perspective view of the showerhead detached from the retaining bracket, with a spray head attachment body aligned with a retaining sleeve.
Figure 4:
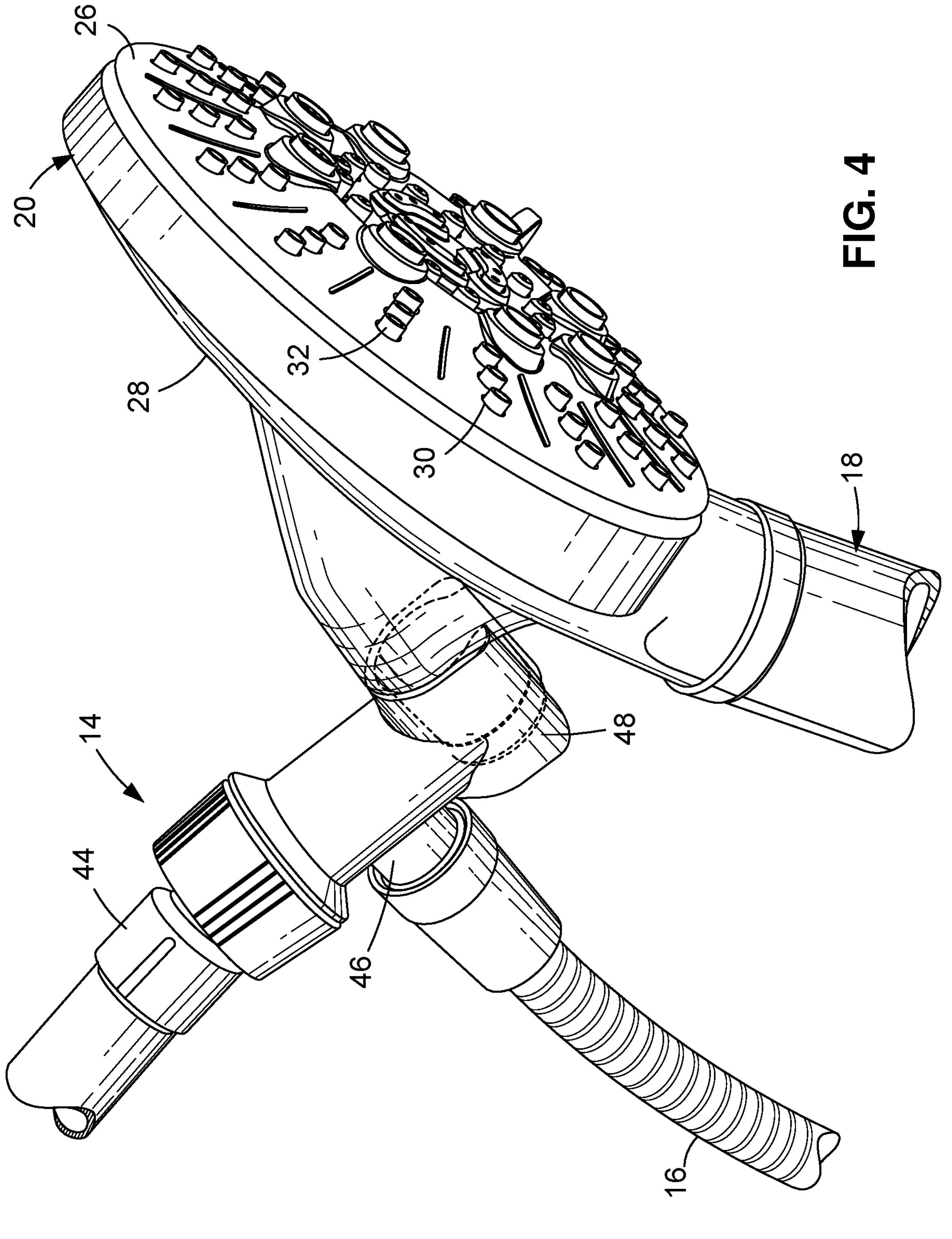
FIG. 4 is an enlarged, partial upper perspective view of the showerhead engaged with the retaining bracket, with the spray head attachment body being received within the retaining sleeve.

Various aspects of the present disclosure relate to a handheld-type showerhead configured to allow for adjustability in the height at which water is sprayed from the showerhead when the showerhead is coupled to a docking bracket. FIG. 1 shows a showerhead assembly 10 including a showerhead 12 coupled to a docking bracket 14 in a raised configuration, while FIG. 2 shows the showerhead 12 coupled to the docking bracket 14 in a lowered configuration. A user may be able to selectively position the showerhead 12 in the raised or lowered configuration as may be desired by the user to achieve a preferable spray height. Furthermore, the showerhead 12 may also be used in an undocked configuration, wherein the showerhead 12 is held by the user to allow for more targeted spraying. In this regard, the showerhead 12 provides the freedom of a conventional handheld sprayer, while also providing selective height adjustability when the showerhead 12 is docked.

In more detail, the showerhead assembly 10 comprises a showerhead 12, a docking bracket 14, and a hose 16 fluidly extending between the showerhead 12 and the docking bracket 14. The showerhead 12 is generally comprised of an elongate handle 18 and a spray head 20 coupled to the elongate handle 18. The elongate handle 18 includes a proximal end portion 22 coupled to the hose 16 and a distal end portion 24 coupled to the spray head 20. The elongate handle 18 may be sized to facilitate manual gripping by a user, as may be desired by the user. In this regard, it is contemplated that the showerhead 12 may be used in a docked mode when attached to the docking bracket 14 or alternatively, in a gripping mode, when gripped or held by the user. The gripping mode may allow the user to place the spray head 20 in closer proximity to the user's body than when the spray head 20 is used in the docked mode. However, when the spray head 20 is used in the docked mode, both of the user's hands may be free, and thus, both modes of operation offer various benefits to the user.

The spray head 20 may include a spraying face 26 and a rear surface 28 opposite the spraying face 26. The spraying face 26 may include a plurality of openings 30 formed therein, with each opening 30 being configured to allow for spraying or dispensing of water. The openings 30 may be arranged in various patterns or arrays to achieve a desired spray configuration. Furthermore, the openings 30 may be of a similar size, or alternatively, the openings 30 may vary in size to achieve different spray densities within the spray pattern. The spray head 20 may also include a dial or other adjuster (not shown) to selectively open or close select openings 30 to vary the spray pattern, as may be desired. Each opening 30 may have a nozzle 32 coupled thereto to achieve a desired flow characteristic of the water passing through the opening 30. The spraying face 26 and the rear surface 28 are joined by an intervening side wall 27 of the spray head 20, that side wall 27 having a generally circular circumferential configuration. The junction between the side wall 27 and the spraying face 26 is defined at a spray head plane 29.

The showerhead 12 may include an internal passageway that extends from the hose 16 to the openings 30, such that water may flow within the showerhead 12 from the hose 16 to the openings 30. The size and configuration of the showerhead 12 may allow for optional integration of an internal water filter cartridge. For instance, the water filter cartridge may be located within the elongate handle 18 and may filter water as the water flow from the hose 16 to the openings 30. The showerhead 12 may include two detachably connectable portions which may facilitate access to the filter cartridge, as may be needed for routine replacement. For instance, the spray head 20 may be threadedly connected to the elongate handle 18 to allow access to an internal cavity defined by the handle 18. For more information regarding the filter cartridge and use thereof, please refer to U.S. Pat. No. 11,192,134, entitled Offset Showerhead Filter, the contents of which are expressly incorporated herein by reference. The configuration of the showerhead 12 may allow for filtration by the filter cartridge when the showerhead 12 is in the raised or lowered configurations.

The showerhead 12 may further include a pair of attachment bodies 34, 36, each of which may be individually engageable with the docking bracket 14. A handle attachment body 34 (e.g., a first attachment body) 30 is connected to the elongate handle 18 and extends from the proximal end portion 22 thereof. In one embodiment, the elongate handle 18 and the handle attachment body 34 are disposed about a common handle axis 38. The handle axis 38 may be defined by the elongate handle 18 and extend longitudinally along a midline of the elongate handle 18. The handle attachment body 34 may extend from the elongate handle 34 along the handle axis 38, with the handle attachment body 34 also being disposed about the handle axis 38. The handle attachment body 34 may be a tapered cylinder, such that an outer diameter of the handle attachment body 34 may vary along the length thereof. In more detail, the diameter of the handle attachment body 34 adjacent the elongate handle 18 may be greater than the diameter of the handle attachment body 34 spaced further from the elongate handle 18. In other words, as the distance from the elongate handle 18 increases, the outer diameter of the handle attachment body 34 may decrease.

A spray head attachment body (e.g., a second attachment body) 36 may extend from the rear surface 28 of the spray head 20 along a second axis 40. In this regard, the spray head attachment body 36 may be a dorsal-style attachment mechanism. The spray head attachment body 36 may be a tapered cylinder, similar to that of the handle attachment body 34. In this regard, the shape and dimension of the handle and spray head attachment bodies 34, 36 may be substantially identical (e.g., there may be minor variations between the two within acceptable manufacturing tolerances). In an exemplary embodiment, the second axis 40 extends at an angle of between 15 and 20 degrees, and preferably about 17 degrees, relative to the spray head plane 29.

The showerhead 12 is fluidly connectable to the water line 42 via the docking bracket 14, which may include a connector 44 configured to be attachable to the water line 42. The connector 44 may include an internally threaded sleeve that is threadedly engageable with threaded end portion of a water line 42. The docking bracket 14 may also include a hose connector 46 and a docking sleeve 48. The hose connector 46 may be configured to be detachably engageable with the hose 16 and the docking sleeve 48 may be configured to be detachably engageable with the attachment bodies 34, 36 (e.g., engagement with one attachment body 34, 36 at a time). The hose connector 46 and the hose 16 may include complementary threaded connectors, a press-fit style connection, or any other connection which facilitates fluid communication between the docking bracket 14 and the hose 16. The retaining sleeve 48 may include a c-shaped wall that defines a channel configured to receive one of the attachment bodies 34, 36. When an attachment body 34, 36 is received within the channel, the outer surface of the attachment body 34, 36 may engage with an inner surface of the docking sleeve 48 to hold the showerhead 12 in place relative to the docking bracket 14. In other words, the inner surface of the docking sleeve 48 may circumferentially engage an outer surface of the attachment bodies 34, 36. It is contemplated that the retaining sleeve 48 may form a closed loop to completely circumnavigate the channel. However, the exemplary retaining sleeve 48, which only partially surrounds the channel, allows for some measure of flexing, which may create a tight fit when the attachment bodies 34, 36 are received within the docking sleeve 48.

The hose connector 46 and docking sleeve 48 may be integrally connected and form a first bracket body that is moveably connected to a second bracket body including the water line connector 44. In one particular embodiment, the first bracket body and the second bracket body may be coupled via a ball-and-socket type connector, which allows for swiveling or pivoting of one bracket body relative to the other bracket body. In the exemplary embodiment, the first bracket body includes socket-type connector and the second bracket body includes a ball-type connector that is moveable relative to the socket-type connector. The ball and socket-type connectors may be configured to facilitate movement of the first and second bracket bodies, while also allowing for fluid communication therebetween. Such adjustment of the docking bracket 14 via movement of the first and second bracket bodies relative to each other may facilitate adjustment of the angle of the showerhead 12 when coupled to the docking bracket 14. In other words, the docking bracket 14 may be adjusted to decrease an angle between the spray head 20 and a horizontal plane, or conversely, increase an angle between the spray head 20 and a horizontal plane, all while the showerhead 12 remains connected to the docking bracket 14. Thus, the configuration of the showerhead assembly 10 allows for adjustment of the height of the spray head 20 through the selective use of either the handle attachment body 34 or the spray head attachment body 36, as well as the angle at which the water is sprayed through the adjustment facilitated by the docking bracket 14.

In use, a user may easily adjust the height of the spray head 20 by deciding which one of the spray head attachment body 36 and the handle attachment body 34 is received within the retaining sleeve 48. The spray head 20 can be elevated by placing the handle attachment body 34 in the retaining sleeve 46, which allows the elongate handle 18 to extend upwardly from the retaining sleeve 46, with the spray head 20 being at an elevated position. The spray head 20 can be lowered by placing the spray head attachment body 36 in the retaining sleeve 48, which moves the spray head 20 to be at the approximate level of the retaining sleeve 48, with the handle 18 extending below the retaining sleeve 48. In either the elevated position or the lowered position, the showerhead 12 can be easily removed from the retaining sleeve 48 by removing the received attachment body 34, 36 from the retaining sleeve 48, which then provides the user with the freedom to move the showerhead 12 in a similar manner to a conventional handheld-type showerhead.

The unique configuration of the showerhead assembly 10 provides an economical, cost-saving alternative to a conventional two-way combination unit incorporating two separate showerheads (e.g., a stationary showerhead and a shower handle having a shower head) and a two-way diverter. Furthermore, the showerhead assembly 10 combines the features and functionality of a conventional 2-position showerhead along with the height increase and convenience of a shower handle and a flexible hose in a single unit. The showerhead assembly 10 provides an aesthetically pleasing fixture compared to conventional two-way combination assemblies that includes a fixed showerhead and a shower handle, which tend to be associated with a bulky aesthetic.

Figure 7:
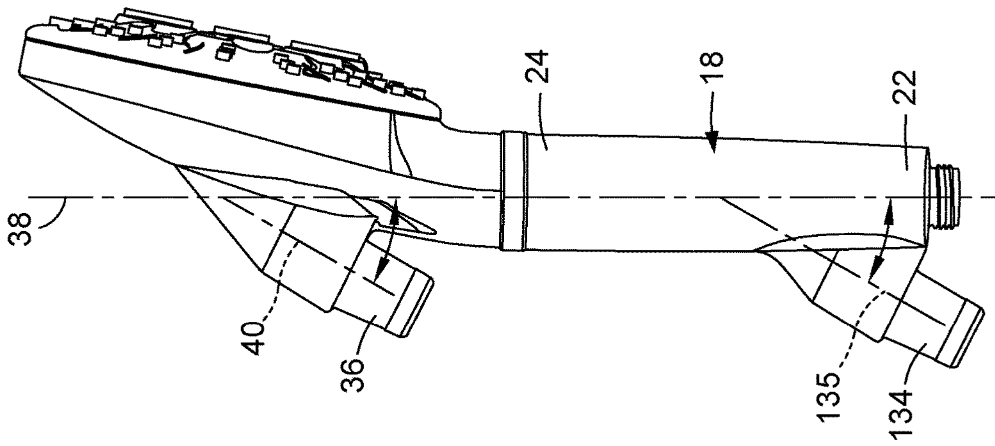
FIG. 7 depicts another embodiment of the showerhead.
Figure 6:
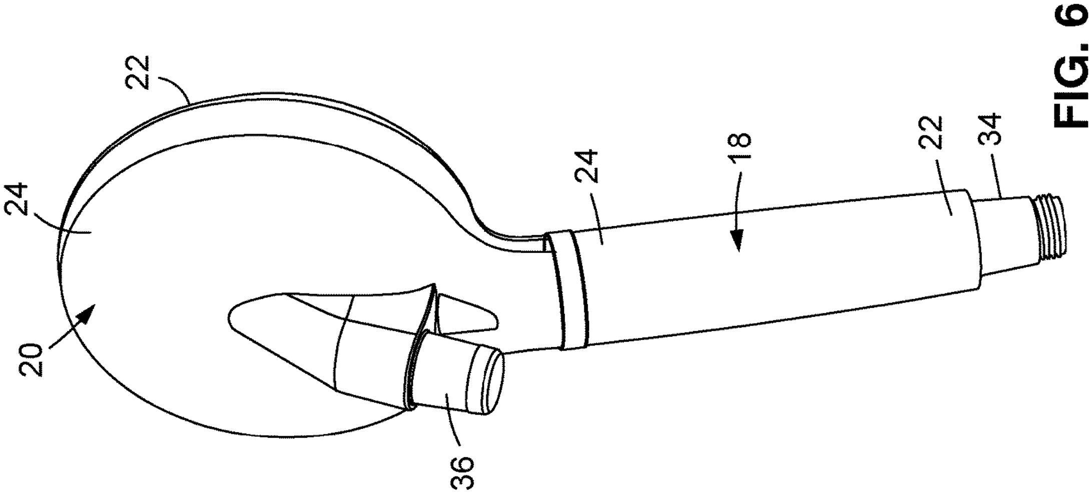
FIG. 6 is a lower perspective view of the showerhead.
Figure 5:
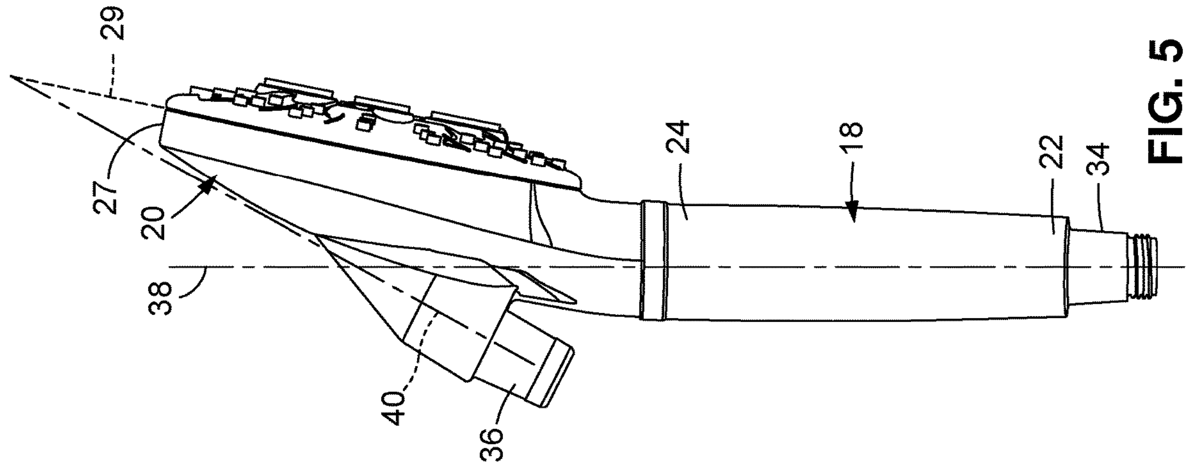
FIG. 5 is a side view of the showerhead.

Although the foregoing describes the handle attachment body 34 as extending from the handle 18 along the handle axis 38, it is contemplated that other embodiments of the showerhead 12 may include a handle attachment body 134 that is angularly offset from the handle axis 38, as shown in FIG. 7. In this regard, the handle attachment body 134 may extend from an outer surface of the handle 18 along an axis 135 that is angularly offset from the handle axis 38. In one embodiment the axis 150 and axis 40 (e.g., the axis along which the spray head attachment body 36 extends) are angularly offset by a similar amount. However, it is understood that they may be angularly offset by different amounts without departing from the spirit and scope of the present disclosure.

Furthermore, although the foregoing describes a showerhead 12 as having both a handle attachment body 34,134 and spray head attachment body 36, it is contemplated that the showerhead may include a single attachment body, or multiple attachment bodies, including multiple handle attachment bodies.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A showerhead configured for use with a docking bracket having a docking sleeve, the docking sleeve including a wall that defines a channel, the showerhead comprising:
- an elongate handle;
- a spray head coupled to the elongate handle, the spray head having a plurality of openings configured to facilitate spraying of water when the showerhead is connected to a water source;
- a first attachment body extending from the elongate handle, the first attachment body including a first tapered cylinder configured to be selectively and interchangeably received within the channel of the docking sleeve; and
- a second attachment body extending from the spray head, the second attachment body including a second tapered cylinder substantially identical to the first tapered cylinder and configured to be selectively and interchangeably received within the channel of the docking sleeve;
- the showerhead being configured to be selectively engageable with the docking sleeve in a first configuration and a second configuration, in the first configuration, the first attachment body being received within the channel of the docking sleeve and the second attachment body being disconnected from the docking sleeve, in the second configuration, the second attachment body being received within the channel of the docking sleeve and the first attachment body being disconnected from the docking sleeve.

2. The showerhead recited in claim 1, wherein the elongate handle includes a proximal end portion and a distal end portion, the proximal end portion being connectable to a hose and the distal end portion being connected to the spray head, the first attachment body extending from the proximal end portion of the elongate handle.

3. The showerhead recited in claim 2, wherein the spray head includes a spraying face having a plurality of openings formed therein, and a rear surface opposite the spraying face, the second attachment body extending from the rear surface of the spray head.

4. The showerhead recited in claim 3, wherein the first attachment body extends along a first axis and the second attachment body extends along a second axis offset from the first axis.

5. The showerhead recited in claim 4, wherein the first axis is offset from the second axis by 15-40 degrees.

6. The showerhead recited in claim 1, wherein the spray head includes a spraying face having a plurality of openings formed therein, and a rear surface opposite the spraying face, the second attachment body extending from the rear surface of the spray head.

7. The showerhead recited in claim 1, wherein an outer diameter of the first tapered cylinder adjacent the elongate handle is greater than an outer diameter of the first tapered cylinder spaced further from the elongate handle, and wherein an outer diameter of the second tapered cylinder adjacent the spray head is greater than an outer diameter of the second tapered cylinder spaced further from the spray head.

8. The showerhead recited in claim 1, wherein the wall of the docketing sleeve is c-shaped.

9. A showerhead assembly comprising:
- a docking bracket having a docking sleeve, the docking sleeve including
- a wall that defines a channel; and
- a showerhead engageable with the docking bracket, the showerhead comprising:
  - an elongate handle;
  - a spray head coupled to the elongate handle, the spray head having a plurality of openings configured to facilitate spraying of water when the showerhead is connected to a water source;
  - a first attachment body extending from the elongate handle, the first attachment body including a first tapered cylinder configured to be selectively and interchangeably received within the channel of the docking sleeve; and
  - a second attachment body extending from the spray head, the second attachment body including a second tapered cylinder substantially identical to the first tapered cylinder and configured to be selectively and interchangeably received within the channel of the docking sleeve;
- the showerhead being configured to be selectively engageable with the docking sleeve in a first configuration and a second configuration, in the first configuration, the first attachment body being received within the channel of the docking sleeve and the second attachment body being disconnected from the docking sleeve, in the second configuration, the second attachment body being received within the channel of the docking sleeve and the first attachment body being disconnected from the docking sleeve.

10. The showerhead assembly recited in claim 9, wherein an inner surface of the wall of the docking sleeve is configured to circumferentially engage the first attachment body when the showerhead is in the first configuration and the first attachment body is received within the channel, and circumferentially engage the second attachment body when the showerhead is in the second configuration and the second attachment body is received within the channel.

11. The showerhead assembly recited in claim 9, wherein the docking bracket includes a connector configured to be attachable to a water line.

12. The showerhead assembly recited in claim 11, wherein the docking bracket is configured such that the connector is moveable relative to the docking sleeve.

13. The showerhead assembly recited in claim 9, further comprising a hose connectable to the docking bracket and the showerhead to place the showerhead in fluid communication with the docking bracket.

14. The showerhead assembly recited in claim 9, wherein the elongate handle includes a proximal end portion and a distal end portion, the proximal end portion being connectable to the hose and the distal end portion being connected to the spray head, the first attachment body extending from the proximal end portion of the elongate handle.

15. The showerhead assembly recited in claim 14, wherein the spray head includes a spraying face having a plurality of openings formed therein, and a rear surface opposite the spraying face, the second attachment body extending from the rear surface of the spray head.

16. The showerhead assembly recited in claim 15, wherein the first attachment body extends along a first axis and the second attachment body extends along a second axis offset from the first axis.

17. The showerhead assembly recited in claim 16, wherein the first axis is offset from the second axis by 15-40 degrees.

18. The showerhead assembly recited in claim 9, wherein the spray head includes a spraying face having a plurality of openings formed therein, and a rear surface opposite the spraying face, the second attachment body extending from the rear surface of the spray head.

19. The showerhead assembly recited in claim 9, wherein an outer diameter of the first tapered cylinder adjacent the elongate handle is greater than an outer diameter of the first tapered cylinder spaced further from the elongate handle, and wherein an outer diameter of the second tapered cylinder adjacent the spray head is greater than an outer diameter of the second tapered cylinder spaced further from the spray head.

* * * * *